United States Patent
Snyder et al.

[11] 3,759,022
[45] Sept. 18, 1973

[54] MOWER COMB
[75] Inventors: Merton F. Snyder; William C. Lindquist; Dale A. Klemenhagen, all of Minneapolis, Minn.
[73] Assignee: Toro Manufacturing Corporation, Minneapolis, Minn.
[22] Filed: June 1, 1971
[21] Appl. No.: 148,574

[52] U.S. Cl. .................................. 56/252, 56/294
[51] Int. Cl. ............................................ A01d 55/20
[58] Field of Search ................ 56/7, 16.1, 249–254, 56/294

[56] References Cited
UNITED STATES PATENTS

| | | | |
|---|---|---|---|
| 1,780,748 | 11/1930 | Fisher | 56/400.21 X |
| 2,286,095 | 6/1942 | Innes | 56/364 |
| 2,556,691 | 6/1951 | Harshbarger | 56/400.21 X |
| 2,021,821 | 11/1935 | Westcott | 56/294 |
| 2,023,697 | 12/1935 | Reynolds | 56/294 |
| 2,085,113 | 6/1937 | Miller | 56/294 |
| 2,751,741 | 6/1956 | Carson | 56/400.04 |
| 2,204,256 | 6/1940 | Picha | 56/252 |
| 2,275,359 | 3/1942 | Gargiule | 56/249 |
| 3,049,851 | 8/1962 | Hargreaves et al. | 56/7 |

FOREIGN PATENTS OR APPLICATIONS

| | | | |
|---|---|---|---|
| 92,761 | 11/1958 | Norway | 56/294 |
| 791,949 | 3/1958 | Great Britain | 56/249 |
| 842,737 | 7/1960 | Great Britain | 56/249 |
| 977,706 | 12/1964 | Great Britain | 56/249 |
| 1,123,029 | 8/1968 | Great Britain | 56/249 |

Primary Examiner—Russell R. Kinsey
Attorney—Vernon A. Johnson and Thomas A. Lennon

[57] ABSTRACT

A comb assembly for use with a reel type mower in which the comb is mounted in advance of the reel so as to engage the grass in front of the reel to loosen the grass, and straighten up bent over blades, and loosen stringers which may have become loosely attached to the turf so as to maximize the number of blades and stringers available to the cutting action of the reel, and to provide a more thorough and high-quality cut, particularly on the putting greens of golf courses. The ground engaging portion of the comb is formed of a resilient plastic material which does not injure the grass, does not tear the turf, passes the twigs without damage to the turf and does not damage the reel or bed-knife should the teeth break off and pass between the reel blades and the bed-knife, the teeth being of such resiliency that they return to their normal condition when unstressed and do not quickly develop a stressed break-line through repeated flexing as metal will do. Furthermore, the teeth are sufficiently elastic to enable them to accurately follow the ground contour over which the mower is traveling. One version of the comb of this invention is also designed so that the comb assembly can also function as a scraper for one of the rollers so as to clean and remove therefrom, fresh clippings which tend to collect thereon and interfere with the proper operation of the mower. In another version, a portion of the comb assembly serves as a grass shield.

12 Claims, 16 Drawing Figures

Patented Sept. 18, 1973
3,759,022
3 Sheets-Sheet 1
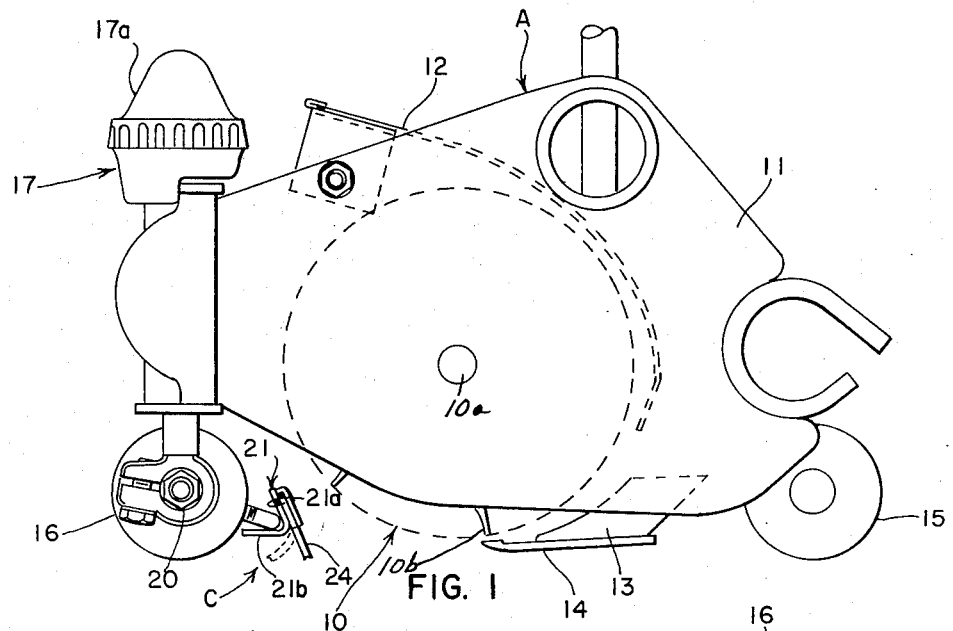
FIG. 1
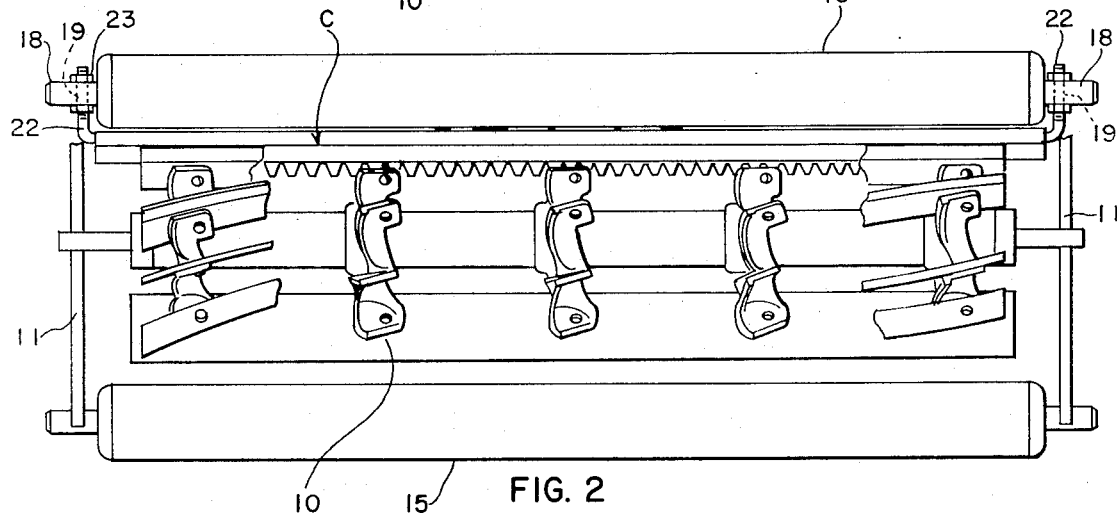
FIG. 2
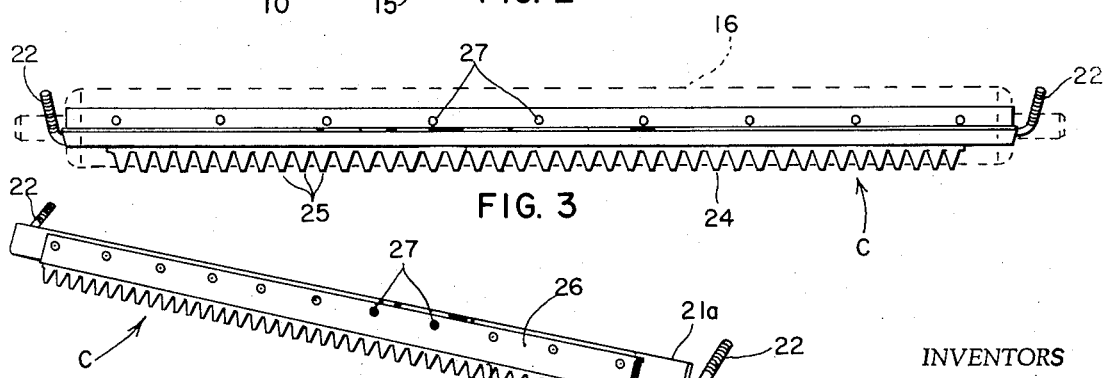
FIG. 3
FIG. 4
INVENTORS
MERTON F. SNYDER
WILLIAM C. LINDQUIST
DALE A. KLEMENHAGEN
BY THOMAS A. LENNON
ATTORNEY Patented Sept. 18, 1973

INVENTORS
MERTON F. SNYDER
WILLIAM C. LINDQUIST
DALE A. KLEMENHAGEN
BY THOMAS A. LENNON
ATTORNEY

Patented Sept. 18, 1973

INVENTORS
MERTON F. SNYDER
WILLIAM C. LINDQUIST
DALE A. KLEMENHAGEN
BY THOMAS A. LENNON
ATTORNEY

MOWER COMB

The primary object of this invention is to provide a comb to engage and work on the grass and turf immediately in advance of the cutting reel of a mower to make as many loose ends of grass available to the cutting edge of the mower as possible to provide a very high quality of cut, particularly on the putting greens of golf courses.

Another important object of this invention is to provide a comb of the aforementioned type which is highly resilient and elastic, which will not readily break when subjected to frequent flexing during use, will not harm the mower if pieces thereof break off and are struck or otherwise engaged by the mower and particularly the blades thereof.

Still another object is to provide a comb assembly which is adapted and designed to not only stir up the grass in advance of the cutting blades, but also functions as a scraper for the roller to minimize and prevent the build-up of wet clippings thereon.

Still another object is to provide a comb assembly which can also function as a shield for controlling the direction of movement of dispersion of the clippings as they leave the reel.

These and other objects and advantages will be apparent from the following description made in conjunction with the accompanying drawings in which:

FIG. 1 is a side view of one type of mower embodying one form of this invention;

FIG. 2 is a top plan view of the cutting blade assembly and the inventive embodiment of FIG. 1, with portions of the structure removed for clarity;

FIG. 3 is a front view of the comb attachment by itself, as seen from the front of the mower, with the roller in broken outline for clarity;

FIG. 4 is a rear perspective view of the comb attachment only;

Figure 5:
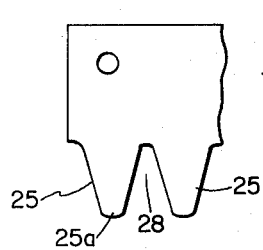
FIG. 5 is a plan view of an enlarged scale of a pair of teeth.

Referring to the drawings, and more particularly to the form of the invention illustrated in FIG. 1, the drawings illustrate the essential portions of the cutting assembly of one of the cutting units of a triplex greens-mower in which three separate cutting units are attached to a vehicle on which the operator rides.

In the illustrated embodiment, a reel assembly 10, including shaft 10a and helical cutting blades 10b, are rotatably mounted between a pair of end plates 11, and rear portion of the reel assembly being partially enclosed by a grass shield 12.

The end plates 11 also support a bed-bar 13 which in turn supports a bed-knife 14, the bed-knife and reel assembly cooperating in a well-known conventional manner to cut the grass by the cooperative shearing action therebetween.

To provide the proper support for the cutting mechanism, and to control the height of cut, a rear roller assembly 15 and a front roller assembly 16 are provided with the cutting assembly disposed therebetween. The front roller assembly is provided with height adjusting mechanism 17 which is operated by the turning of the control knob 17a by the operator. The front roller has a pair of stub axles 18, one of which extends from each end of the roller, each of said stubs axles having a transverse comb mounting openg 19 formed therein, each of the axles being provided with a ball stud 20 for holding the axles in any desired position.

The comb assembly C includes an elongate v-shaped mounting bracket 21 having arms 21a and 21b, 21a being referred to herein as the comb supporting arm and 21b being referred to herein as the scraper arm. Each end of the bracket 21 has welded or otherwise integrally affixed thereto a threaded mounting bolt 22 which is designed to be inserted in and extend through the hole 19 in the axle and be secured thereto in the desired position by means of nuts 23. The outer face of the comb arm 21a has secured thereto as by riveting a resilient elastic comb 24 which is preferably formed of plastic material such as Urethane and which has a plurality of generally downwardly extending truncated teeth 25 for engaging and standing up the grass in advance of the mower. The comb is held in place on the mounting bracket 21 by means of an elongate, generally rectangular support member 26 which in effect, clamps the plastic comb to the mounting bracket, the support 26 and the comb 24 being effectively held in place by a plurality of rivets 27.

When mounted on the front roller, the comb assembly is positioned a small incremental distance (such as 30 thousandths of an inch) from the roller 16, so that the edge of the arm 21b of the comb mounting bracket is a small distance from the roller, so that it can function as a scraper blade for the roller during use.

It will be apparent that the height of the comb assembly can be readily adjusted by loosening the ball studs, turning the plastic comb to the desired position and then tightening same.

As the comb travels along the ground through the turf ahead of the cutter, it will be repeatedly flexed and bent, as illustrated by the broken line position of FIG. 1. However, because of its resilience, it will not form a breakline, as metal might do. The resiliency of the teeth also enables the teeth to more closely conform to ground contours without unduly stressing the comb or its support, and without gouging or digging the turf in a destructive manner.

In addition, the illustrated cutting unit A is a front throw type mower commonly used to cut the putting greens of golf courses. The cutting is frequently done when the greens are wet and therefore, as the wet clippings are thrown forwardly on, past and ahead of the front roller 16, the wet clippings rapidly build up on the front roller 16, thereby causing frequent delays to clean the roller. In the illustrated embodiment, however, the edge of arm 21b serves as a scraper to keep the roller 16 free from excessive accumulation or clippings, and yet doesn't interfere with the operation of the roller or slow it up, since it isn't in direct contact therewith.

Figure 7:
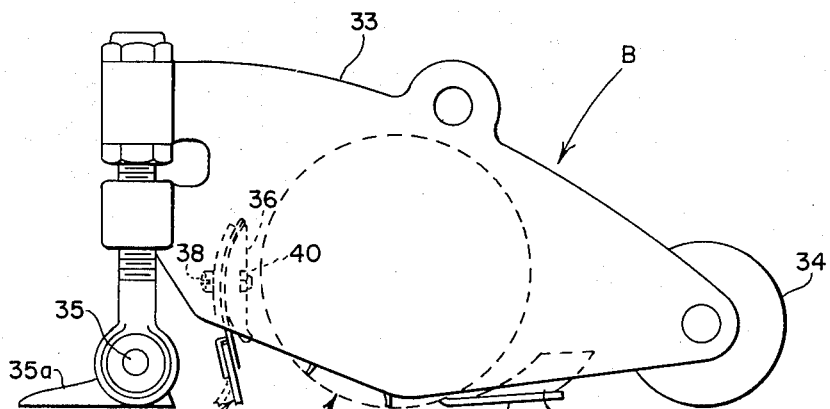
FIG. 7 is a side view of an alternate form of this invention mounted on a somewhat different type of mower.
Figure 8:
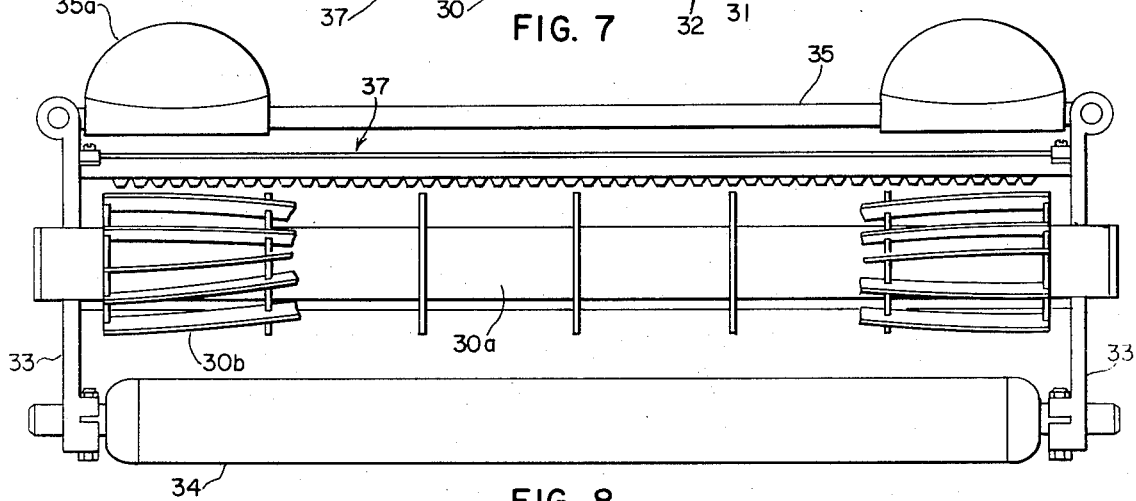
FIG. 8 is a top plan of the embodiment of FIG. 6, with portions removed for clarity.
Figure 9:
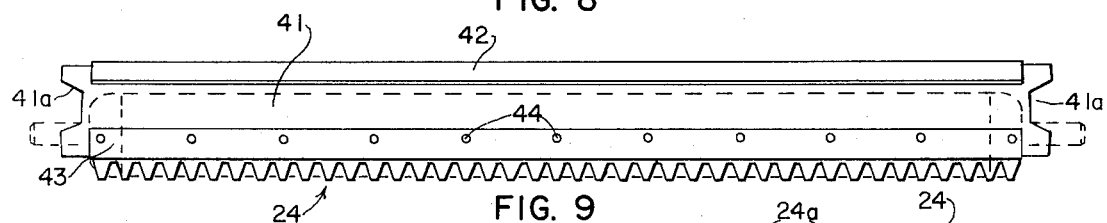
FIG. 9 is a front view of the comb assembly of FIG. 7, as seen from the front side of the mower.

In the alternate form of the invention illustrated in FIG. 7, a slight modified form of cutter unit is illustrated in its entirety by B, the cutter unit of FIG. 7 being specifically designed for use with the walk-behind type of greensmower, rather than the riding type of the former description. In this embodiment, a bed-bar 31 and a bed-knife 32 (which cutter unit B includes a rotatable shaft 30a and a plurality of helical cutting blades 30b mounted thereon), supported at each end by a pair of end plates 33, a rear roller 34 and a front shaft 35, on which a pair of front skids or runners 35a are mounted.

The end plates 33 are provided with curved mounting bosses 36, one at each end, located on the interior face of the end plates, to which bosses a grass shield is mounted if the comb of this invention is not used. However, in the illustrated embodiment, the grass shield is not shown, and the comb assembly 37 is shown mounted and attached to the bosses 36 by means of mounting screws 38 which pass through suitable openings in the mounting bosses 36, and are held securely in place by means of nut 40, the comb assembly also serving as a shield, as well as a comb.

Whereas the earlier described version of this invention has the dual function of both a comb and a scraper, the alternate embodiment 37 herein being discussed has the dual function of a grass shield and a comb rather than the scraper-comb combination of the other embodiment of this invention. In this version 37, the comb-shield assembly of combination 37 includes an elongate curved grass shield 41 which also functions as the primary support for the comb. The upper edge of the shield is turned over as at 42 for reinforcement thereof. The lower portion of the shield 41 has attached to the front face thereof, a comb 24 which corresponds to the comb 24 of version C, the comb 24 also being resilient and elastic and formed of preferably plastic material such as Urethane. The plastic comb is held in place by means of a support member 43 which serves to clamp the comb 24 to grass shield 41, the rivets 44 holding the comb and comb support in place on the grass shield. Each end of the shield is provided with cut-outs 41a which are adapted to overlie the bosses 36 for proper position of the shield and comb, the shield being adjustable relative to the bosses and held in place at each end by a curved hold-down clip 45, which is secured by screw 38 and nut 40, said nut being seated in a recess 36b formed in the rear of boss 36.

Thus, the comb is interposed between the cutting assembly and the front support 35a so that the teeth of the comb can stand up stringers and bent over grass for cutting by the reel 30. The bosses have forwardly facing convexly curved surfaces 36a which engage the concavely curved interior face 41a of the grass shield which is substantially complimentary to surface 36a.

The inner faced clip 45 is concavely curved so as to mate with the outer convexly curved surface of the grass shield 41.

It will further be appreciated that the comb assembly 37 can be vertically adjusted by loosening of the nut 40 to allow for variations in turf or ground contour or to adjust the comb as the teeth begin to wear It will be further appreciated that both the comb assembly C and the comb assembly 37 can be readily replaced if they do become damaged or unduly worn.

Figure 6:
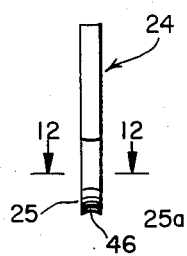
FIG. 6 is a side view of said teeth.
Figure 12:
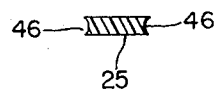
FIG. 12 is a sectional view of a tooth taken along the line 12—12 of FIG. 6.
Figure 13:
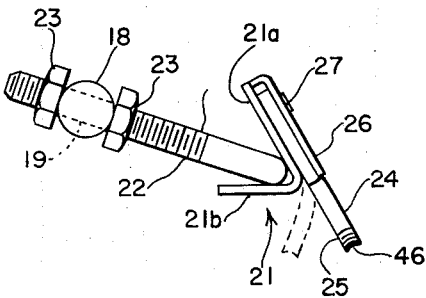
FIG. 13 is an enlarged side view of the comb assembly of FIG. 1, and its connection to the roller shaft.
Figure 14:
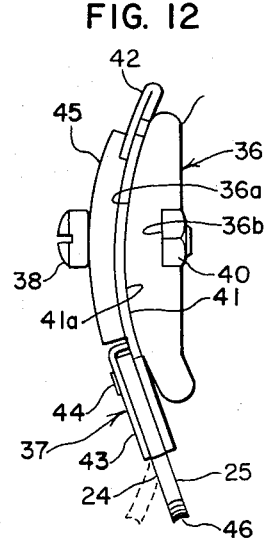
FIG. 14 is a side view on an enlarged scale of the comb assembly of FIG. 7 and the mounting boss to which it is attached.
Figure 15:
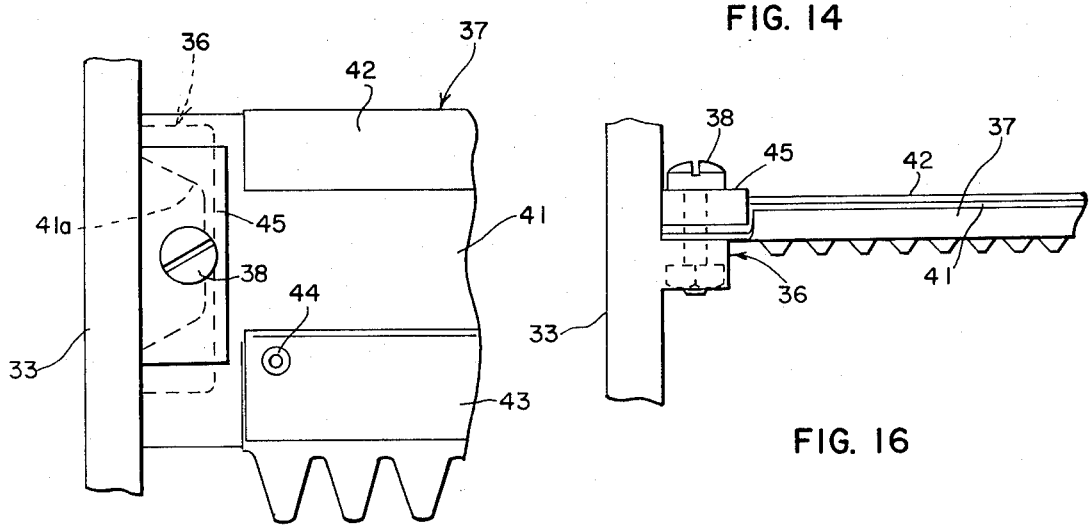
FIG. 15 is a front view on an enlarged scale of one end of the comb assembly of FIG. 7 and the side plate to which it is attached.
Figure 16:
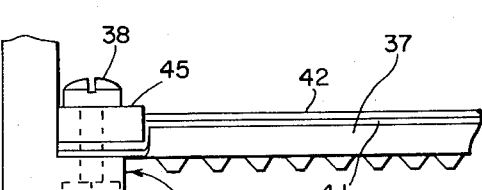
FIG. 16 is a top view of FIG. 15.
Figure 10:
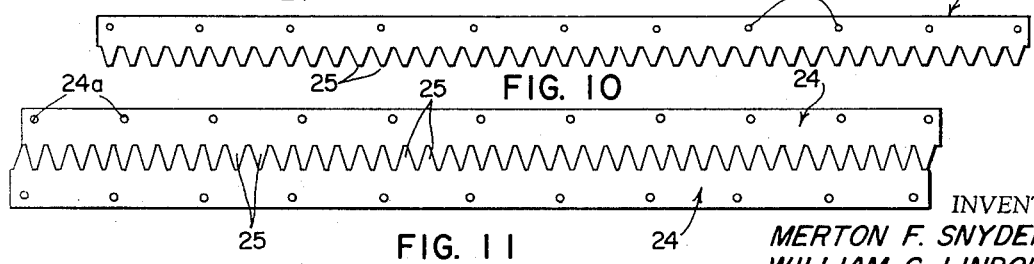
FIG. 10 is an elevational view of the plastic comb portion only.

Attention is also directed to the novel construction of the plastic comb strip in each of the comb assemblies, the strip being identical in both instances and identified by the same reference numeral 24 in both versions. The comb strip 24 is illustrated in unassembled form in FIG. 10 and a portion thereof is shown on an enlarged scale in FIGS. 5 and 6.

Figure 11:
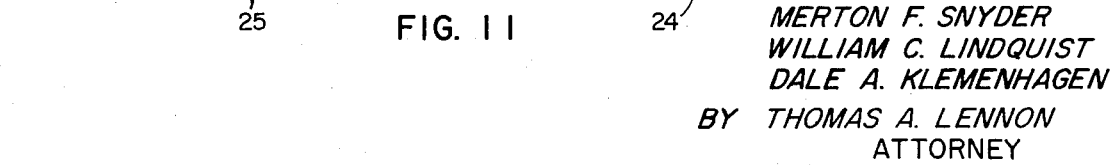
FIG. 11 is an elevational view of a strip of plastic material after it has passed through dies and cut into the desired shape, and prior to the sections thereof being separated and embodies in the aforedescribed assemblies.

The plastic comb strips 24 are the end product of a novel process which involves submitting a strip of plastic material to a Rule die which, simultaneously cuts the teeth 25 and the holes 24a in the plastic strip and thereby simultaneously forms two identical combs 24 so that as the strip leaves the machine, it has the appearance illustrated in FIG. 11 with opposite sides of the strip representing identical comb portions which are simply separated as they are removed from the Rule die, thereby providing two complete plastic combs which can be used in either of the comb assemblies C and 37 previously described. The openings 24a are designed to receive the rivets 27 and 44 of the respective comb assemblies.

In each comb the teeth 25 are identical in size and shape to each other and to the cut-out portion or space 28 between each pair of teeth 25.

The lower ends of apexes 25a of the teeth are not sharply pointed but are of a somewhat blunted shape and in one version of the comb, the teeth are approximately ⅛ inch in width so that they are less prone to damage the grass through which they are traveling. It will also be noted that the entire marginal edge or periphery of each of the teeth on each side and on the lower tip are formed with a channel, or groove 46.

The comb assembly C is readily adjusted relative to the roller by adjusting the mounting bolts 22 longitudinally relative to their respective stub axles 18, together with adjustment of the pair of nuts 23 for each mounting bolt so that the comb assembly is tightly secured to and mounted on the roller assembly. The angular position of the comb assembly C is accomplished by loosening the ball studs 20 and turning the axles 19 and the comb assembly C attached thereto to the desired angular position.

The rivets 27 securely hold the clamping plate 26 and comb assembly 24 in place on the mounting or backing member 21 during use, so that the comb won't work loose and become disengaged from the comb assembly during use.

The comb supports 21 and 41 and their respective clamping members 26 and 43 are of rigid construction, preferably metallic.

The preferred forms of comb 24 utilizes approximately ⅛ inch thick polyurethane material of 73 – 87 durometer. (Shore A)

As to the comb assembly 37, it is held on the mounting bosses 36 by the action of clips 45 which overlie the cut-out portion 41a of the shield 41 and engage the portion of the shield immediately surrounding and defining the cut-outs. The clip is held in place by the fastener 38, which extends through the cut-out to the boss. To vertically adjust the comb assembly 37, all that is necessary is to loosen the screws 38, thereby loosening the clamping action of the clips 45, whereupon the shield 41 can be slid up or down relative to the fastener 38 and boss 36 to the desired position, and the screw 38 are then retightened.

It will of course be understood that various changes may be made in the form, detail, arrangement and proportion of the parts without departing from the scope of this invention.

What is claimed is:

1. In a mower assembly including cutting means, the improvement comprising:
    a supporting frame for said cutting means,
    comb means supported by said frame means and positioned to engage the turf in advance of said cutting means,
    a ground engaging roller positioned forwardly of said cutting means,
    said comb means including a comb supporting member,
    said supporting member having an elongate edge portion positioned contiguous with and substantially parallel to said roller for removing material collected on said roller.

2. The mower assembly of claim 1, wherein said supporting member is v-shaped in cross-section, one arm of which provides said elongate edge portion, the other arm of which serves to support a comb element having depending ground engaging teeth.

3. In a mower assembly including cutting means, the improvement comprising:
    a supporting frame for said cutting means, including a pair of end plates and said cutting means includes a rotatable cutting reel rotatably supported by said end plates,
    comb means extending between and supported by said end plates and positioned to engage the turf in advance of said cutting means, and wherein said comb means includes a rigid comb supporting member, said supporting member having an elongate comb element depending therefrom, and means for removably fastening said supporting member to said end plates, and wherein said supporting member has cut-out portions at each end,
    and wherein said means for removably fastening includes a clip for engaging said supporting member adjacent said cut-out portion and a threaded fastening element insertable through said clip and cut-out portion and a portion of said end plate to secure said member to said plate.

4. In a mower assembly including cutting means, the improvement comprising:
    a supporting frame for said cutting means,
    comb means supported by said frame means and positioned to engage the turf in advance of said cutting means,
    said cutting means including a rotatable reel,
    and wherein said comb means includes an elongate comb supporting member positioned in front of said reel, said member being arcuate in cross-section positioned to conform to the periphery of the reel and being adapted to serve as a shield to intercept vegetation cut by said reel, and comb means supported by said member and depending therefrom so as to engage the turf in advance of said cutting reel.

5. In a mower assembly including cutting means, the improvement comprising:
    a supporting frame for said cutting means,
    comb means supported by said frame means and positioned to engage the turf in advance of said cutting means,
    wherein said frame includes a pair of end plates and said cutting means includes a rotatable cutting reel rotatably supported by said end plates,
    said comb means extending between and supported by said end plates, said comb means including a rigid comb supporting member,
    said supporting member having an elongate comb element depending therefrom,
    means for removably fastening said supporting member to said end plates,
    wherein the ends of said supporting member are fastened to said mounting bosses, and
    wherein said mounting boss is provided with an opening extending therethrough,
    and including fastening means insertable in said opening and engageable with said supporting means and mounting boss for securing said supporting member to said mounting boss.

6. The mower assembly of claim 5 wherein each of said mounting bosses have a convexly curved surface, and wherein said supporting member has a complimentary concave surface for engaging said curved surface of said mounting boss.

7. The mower assembly of claim 6 including an arcuate clip forming a part of said fastening means and engageable with said supporting member for holding same against said boss.

8. In a mower assembly including cutting means, the improvement comprising:
    a supporting frame for said cutting means,
    comb means supported by said frame means and positioned to engage the turf in advance of said cutting means,
    roller means positioned in advance of said roller with said frame,
    means connecting said roller with said frame,
    means for mounting said comb assembly on said means connecting said roller with said frame,
    wherein the means connecting said roller to said frame comprising stub axles extending from opposite ends of said roller,
    and wherein said comb assembly includes a threaded fastening element at each end thereof,
    each of said axles having an opening from therein, said threaded fastening elements being insertable into opening of said axles for mounting said comb assembly thereon.

9. In a mower assembly including cutting means, the improvement comprising:
    a supporting frame for said cutting means,
    comb means supported by said frame means and positioned to engage the turf in advance of said cutting means, said comb means including an elongate rigid supporting member which is v-shaped in cross-section,
    each end of said supportime member having rigidly secured thereto an elongate threaded fastening element extending rearwardly past the open side of said member substantially perpendicular to the length of said supporting member, a plastic comb element mounted on the exterior face of one of the arms of said support element and extending past the apex of said supporting member, and fastening means for securing said blade to said supporting member to thereby clamp said comb element to said support member.

10. In a mower assembly including cutting means, the improvement comprising:

a supporting frame for said cutting means, comb means supported by said frame means and positioned to engage the turf in advance of said cutting means, wherein said comb means includes an elongate supporting member having a curved cross-section, said supporting member having a concave surface and an opposing convex surface, a comb element secured to said convex surface, and an elongate fastening plate for clamping said comb element to said supporting member.

11. In a mower assembly including cutting means, the improvement comprising:

a supporting frame for said cutting means, comb means supported by said frame means and positioned to engage the turf in advance of said cutting means, wherein said comb means includes teeth formed of plastic material, said teeth generally v-shaped in plan, the apex thereof having a blunt edge portion, the surface of which is concave.

12. The mower assembly of claim 10 wherein openings on each side of central portion, whereby two identical plastic comb elements are formed from said strip of plastic material in a single cutting operation by said die.

* * * * *